(12) United States Patent
Szabo et al.

(10) Patent No.: US 7,376,511 B2
(45) Date of Patent: May 20, 2008

(54) METHOD FOR PROVIDING A LOCATION-BASED APPOINTMENT SERVICE

(75) Inventors: Peter Szabo, Pforzheim (DE); Horst Roessler, Filderstadt (DE); Michael Walter Hoche, Schwieberdingen (DE); Eric Gaudin, Montrouge (FR)

(73) Assignee: ALCATEL, Paris (FR)

( * ) Notice: Subject to any disclaimer, the term of this patent is extended or adjusted under 35 U.S.C. 154(b) by 365 days.

(21) Appl. No.: 11/153,330

(22) Filed: Jun. 16, 2005

(65) Prior Publication Data
US 2005/0283308 A1    Dec. 22, 2005

(30) Foreign Application Priority Data
Jun. 17, 2004  (EP)  ................. 04291541

(51) Int. Cl.
*G01C 21/34* (2006.01)
*G06F 17/00* (2006.01)
(52) U.S. Cl. .................. 701/210; 340/539.13
(58) Field of Classification Search ............ None
See application file for complete search history.

(56) References Cited

U.S. PATENT DOCUMENTS 5,790,974 A * 8/1998 Tognazzini ............ 455/456.5
6,424,910 B1 * 7/2002 Ohler et al. ............. 701/202
7,143,130 B2 * 11/2006 Lin ........................ 709/203
2002/0115453 A1 * 8/2002 Poulin et al. ............ 455/456
2003/0027558 A1   2/2003 Eisinger
2003/0125963 A1 * 7/2003 Haken ........................ 705/1
2004/0039579 A1 * 2/2004 Chithambaram et al. ..... 705/1

FOREIGN PATENT DOCUMENTS

GB        2276151 A        12/2002
WO    WO 01/20409 A2 *   3/2001

* cited by examiner

*Primary Examiner*—Michael J. Zanelli
(74) *Attorney, Agent, or Firm*—Sughrue Mion, PLLC

(57) ABSTRACT

The present invention relates to a method for providing a location based appointment service for arranging meeting co-ordinates between a plurality of subscribers using a wireless device; determining the location of the wireless device and navigation information to the meeting co-ordinates; and providing the navigation information by the wireless device, in order to guide a subscriber to adhere to the meeting co-ordinates, and aligning the navigation information with the navigation information of another subscriber of said plurality of subscribers in order to guide the subscriber and the another subscriber commonly on approximating routes. The invention further relates to a computer software product, a server, a telecommunication service, and a mobile telecommunication device therefor.

11 Claims, 10 Drawing Sheets

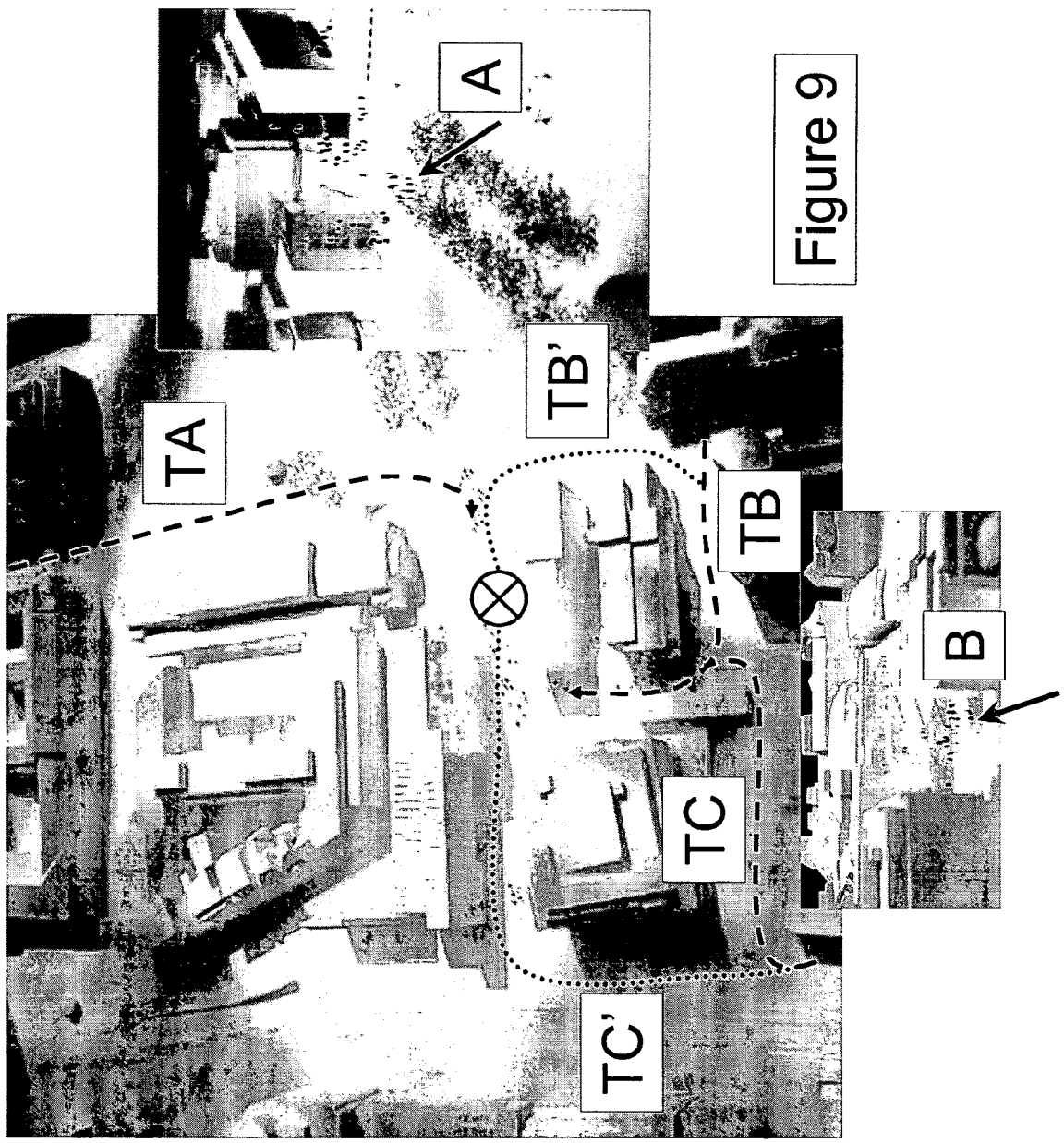

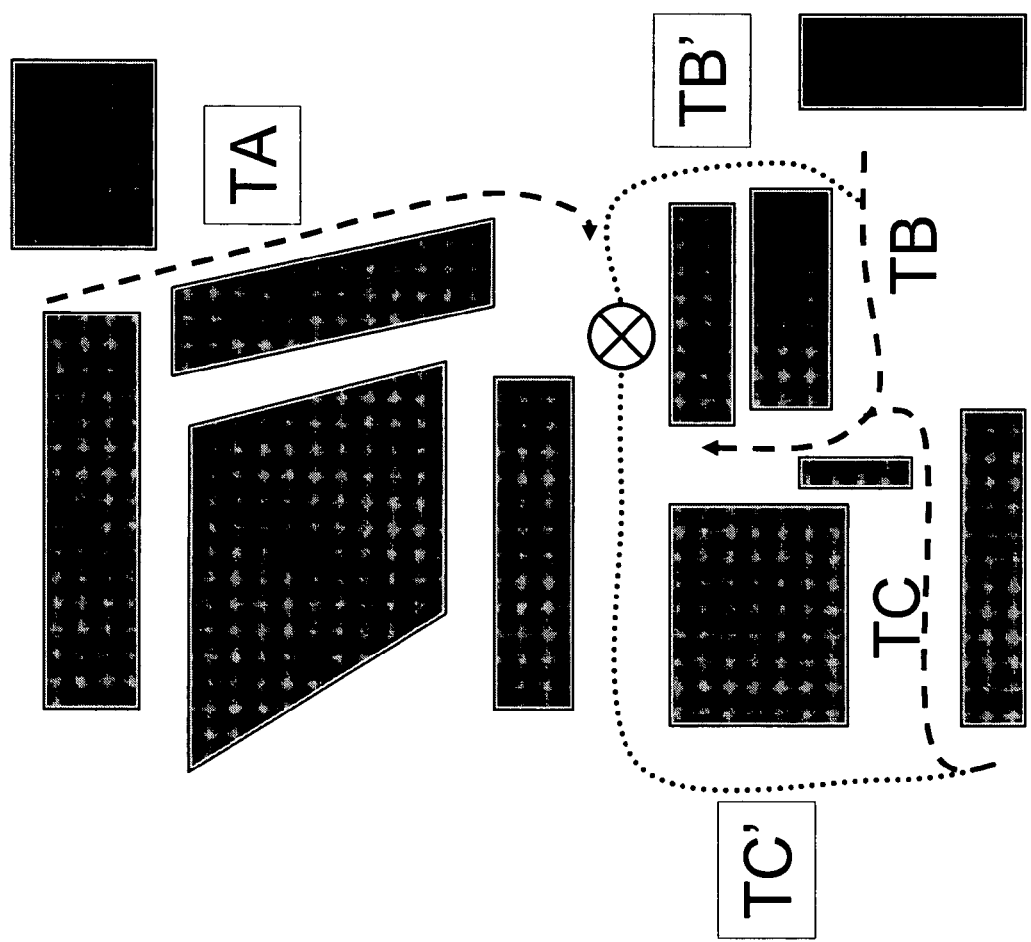

METHOD FOR PROVIDING A LOCATION-BASED APPOINTMENT SERVICE

TECHNICAL FIELD

The present invention relates to a method for providing a location based appointment service. The invention further relates to a computer software product, a server, a telecommunication service, and a mobile telecommunication device therefor.

The invention is based on a priority application, EP 04291541.3, which is hereby incorporated by reference.

BACKGROUND OF THE INVENTION

Mobiles and (portable) organizers are well known. Technically these devices are hand-held microcomputers that perform specific tasks. They can be used as an electronic diary or alarm clock or recorder of memos or a portable database etc. There are already devices available that provide a user navigation service, i.e. the device acts as a locator and provides assistance in finding (fixed defined) locations like addresses etc.

In order to provide such services the device comprises means for providing the service, e.g. firm ware or software, operating systems; or the device involves a telecommunication service, that is a remote means, e.g. a software running on a server or any other kind of network resource, e.g. a mobile agent or a programming update of the mobile device providing the necessary capabilities through a network.

An appointment is considered as a meeting arranged in advance, i.e. meeting place, time, participants, duration, etc.

U.S. patent application Publication No. 2003/0027558 discloses a method for executing a service for organization of meetings for participants in a communications network, and a service computer and program module for this. This method comprises the steps of storage of an invitation to a meeting transmitted from a terminal device of an inviting participant, specifying the location, time, and a participant identifier, in particular a call number or a network address, of one or more invited participants, receiving of location information about an invited participant, determination of a travel route from the location of the invited participant to the meeting place, and estimation of the travel time required by this participant, calculation of a time, allowing for the estimated travel time, at which the invited participant must begin his journey, and sending of information, in particular a message containing travel details and a recommended starting time for the journey, to a terminal device of the invited participant at least once by this time, along with a service computer and program module for this.

One disadvantage of the method referred to is that the appointment, hereinafter more generally called the meeting coordinates, will slightly change due to unexpected events and that the check point, i.e. the meeting location, is an area rather than an exact point.

The current invention focuses on the problem of fuzzy appointment information such that participants (or subscribers) will adhere fluctuating meeting co-ordinates.

This problem is solved by a method for providing a location based appointment service, the method comprising the steps of arranging meeting co-ordinates between a plurality of subscribers using a wireless device;

determining the location of the wireless device and navigation information to the meeting co-ordinates;

providing the navigation information by the wireless device, in order to guide a subscriber to adhere to the meeting co-ordinates; and aligning the navigation information with the navigation information of other subscribers of said plurality of subscribers in order to guide the subscribers commonly on approximating routes.

And, preferably, thereby rendering fuzzy floating parts that are aligned by dynamically updated navigation information on the way. The problem is solved inter alia by a computer software product, a server, a telecommunication service, and a mobile telecommunication device.

Thus, by combination of a navigation system, a localisation and information interchange, the invention provides a method which eliminates the need to make several mobile calls to arrange a check point. And the invention provides a virtual private checkpoint with relative navigation information.

SUMMARY OF THE INVENTION

Accordingly, it is an object and advantage of the present invention to provide a service comprising existing service functions like localization, notification, and navigation service, etc. that are suited to recognize the distance between participants (requesting this service) and the distance from a chosen checkpoint. Once invoked the service notifies the persons about the distance of the participants and to the chosen checkpoint. The service assists in navigation or invokes further navigation services e.g. configuring a car navigation system.

Another advantage of the present invention is that it is a very simple but effective "navigation aid" in everyday life. It is easy to understand and simple to implement based on the current mobile infrastructure platforms.

A further advantage of the present invention is that it reduces explicit synchronization effort between the participants and therefore enhances user friendliness. It further optimizes the use of involved transportation means.

BRIEF DESCRIPTION OF THE DRAWINGS

These and many other objects and advantages of the present invention will become apparent to those of ordinary skill in the art from a consideration of the drawings and ensuing description, where

FIG. 9 shows the upright projection (sheer plan) of the common rendered presentation of a final check point approximation of the appointment scenario with location based appointment service according to the invention;

FIG. 10 is the upright projection of FIG. 9.

DETAILED DESCRIPTION OF THE INVENTION

Figure 1:
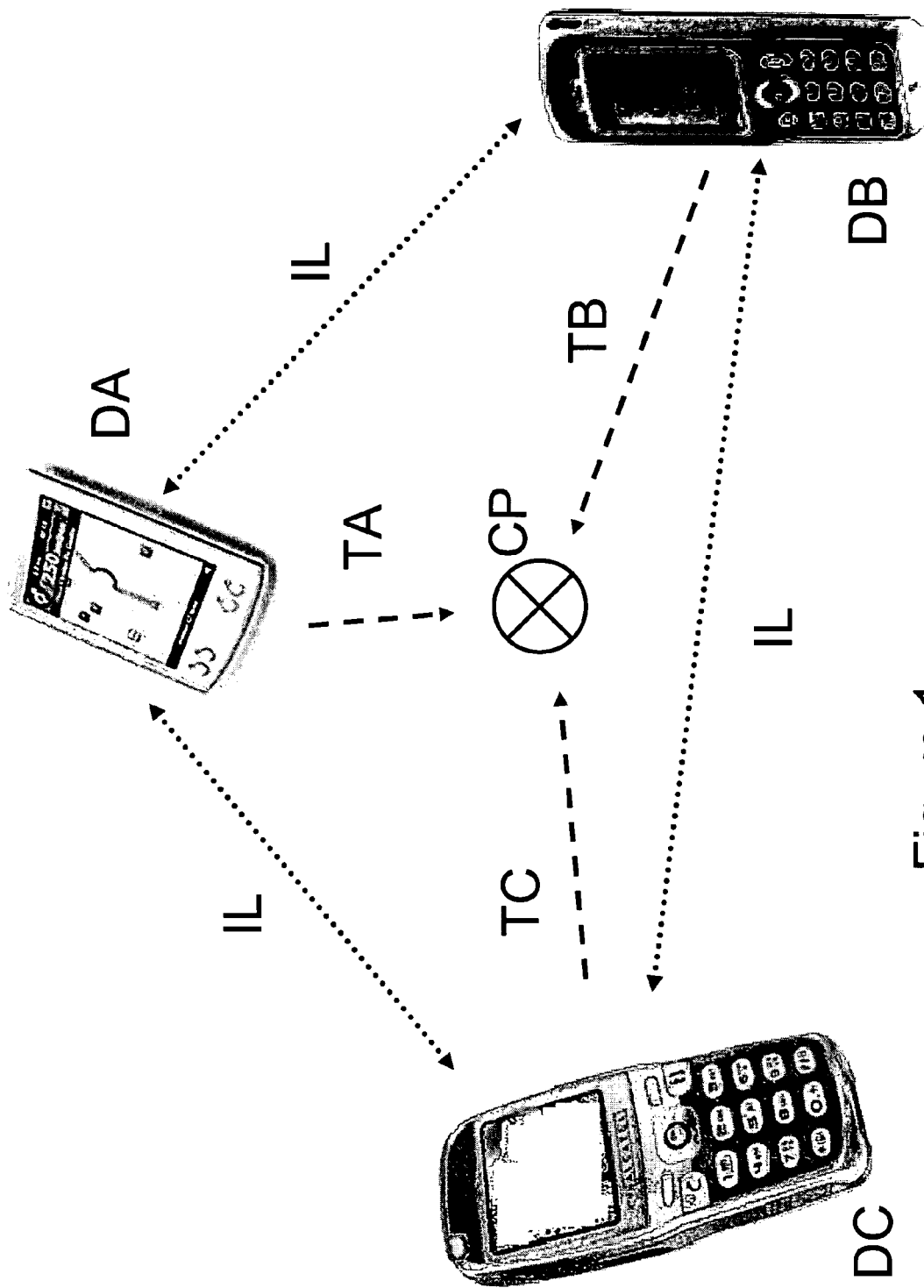
FIG. 1 is a drawing of three mobile devices providing a location based appointment service according to the invention.

The smooth coordination of a meeting point for a plurality of participants requires just in time navigation. Currently two persons each equipped with a mobile have to make calls to each other to agree on a meeting point (checkpoint) or to inform each other when they will arrive at this point. When they have made their appointment i.e. the meeting coordinates comprising for instance values for longitude/latitude/altitude, time, address, location topology, participants, graphical presentation like pictures or maps etc., the meeting coordinates are used to determine each participant's way to the meeting coordinates.

In order to describe the problem and for the reader's convenience the navigation problem is reduced to an abstract mathematical problem of identifying a path on the real plane. A path is a function p: $[a,b] \to R^2$, where $[a,b]$ is a time interval, p is a continuous function, and $R^2$ is the plane of the real numbers. Each point t within the time interval corresponds to a position p(t) in the real plane $R^2$.

A participant A at location (xA, yA) in a simplified abstract scenario has to meet meeting coordinates, i.e. meeting time tm and meeting location coordinates (xm, ym). In order to adhere to the meeting appointment the participant has to render a path pA: $[,] \to R^2$, satisfying the following constraints: let ts be the start time; then pA(ts)=((xA, yA); i.e. the path of the participant starts at the current location, and pA(tm)=(xm, ym); i.e. the path ends at the check point.

The task of identifying a path between two endpoints, i.e. the participant's current position and the meeting coordinates is commonly known as navigation. Since there exists indeed a manifold of paths certain optimal paths are identified, e.g. the shortest path etc. which is in the current example simply a path where the trace (the image of the path) is a line between the endpoints. Another set of constraints (like buildings or streets etc.) are allowed and forbidden areas.

For identifying paths i.e. navigation, usually maps are applied comprising such information of allowed and forbidden areas. A common used presentation is a graph of interconnections between points. That is a set of points say (X1,Y1) and (X2, Y2) that are interconnected by interconnections ((X1,Y1), (X2, Y2)). Each of these structures might have additional (attributes) information. For points this might be names, timetables, available transportation means etc. and for interconnections this might be names, distances, duration, etc.

A path is usually identified by a divide and concur method or a dynamic programming method that computes (completes) the (relevant) transitive closure of this graph. This might be done using the Floyd-Warshall algorithm or the Dijkstra algorithm, cf. Chapter 7 of the textbook on Algorithm Design, M.T. Goodrich et al.

The challenge is to combine the navigation of the participants.

The simplest approach is to render for each position (and thus time) a new path. For reasons of simplicity, the description of this approach uses the following assumed procedure
PROCEDURE Path(Start, End: Coordinate_type): Path_ type that has a starting and end coordinates, e.g. comprising time and location information, as input parameters and returns a description of an path. This could e.g. the best path match (if there is one, e.g. the shortest) or even a set of alternative paths.

When a scenario begins the participants agree on an end point, i.e. the check point, E say. Each participant P has a certain position, SP say. Thus each participant P has an individual a priori path Path(SP, E). When this participant(s) start(s) moving after a while they all have different positions compared to their starting point, SP' say. The individual a posteriori path then is Path(SP', E).

Beside the iterative actualization of path information, i.e. current navigation, it is advantageous to vary the end point. Especially in scenarios where one participant is inhibited at his/her position. This might be done by iterative aligning the end point E between the participants, automatically, which might be done by the following procedure
PROCEDURE Mean(List of Point: Coordinate_type): Coordinate_type The input is a list of points and returns a center of the points. This center might be the mathematical mean, i.e. the barycenter, or any other mean. E.g. a mean with respect to travel time or a mean satisfying already agreed constraints like areas or a time of arrival interval. This leads to the following appointment algorithm:

```
PROCEDURE Apointment1 (List of Participants P : Participant_type)
    DO Suggest or modify an checkpoint E : Coordinate_type
    UNTIL all participants agree on the checkpoint E
    DO
        REMARK: provide personal navigation information
        FOR ALL participants P DO PRINT Path( position(P), E)
        REMARK: render new agreed checkpoint E
        E = Mean(List of position(P), E)
    UNTIL all participants are at the checkpoint E
```

A generic improvement for this algorithm is instead of dealing with coordinates, i.e. definite points or times, generalizing the used types to handle fuzzy values, i.e. intervals or likelihood. This could e.g. be done by applying rigorously (straightforward) the principles of interval arithmetic or random variables instead of fixed values.

This principle of variation is also applicable to paths and not only to points. A preferable feature of the appointment service according to the invention is that the service should guide participants together, commonly. I.e. approximating common paths is preferred to single individual paths.

A real navigation algorithm applies usually two principles, the graph is presented hierarchically with respect to a scale to accommodate on the one side computational complexity like space and time and on the other side presentation complexity, i.e. a bird's eye view has no details. The second principle is that a path is rendered in a device an concur manner by making use of this hierarchical decomposition and of a spatial geometrical decomposition.

To illustrate these facts suppose a graph with three granularity layers. Each layer is represented as a separate graph. Common points might be shared for the reason of changing the granularity according to the principle that coarse graph points are in finer graphs. A simple path algorithm might have the following procedure call
PROCEDURE PathG(S, E: Coordinate_type, G: Granularity_type): Path_type where a simple algorithm might be
(a) Identify the closest start point SG in the graph with granularity G
(b) Identify the closest end point EG in the graph with granularity G
(c) Let p1=Path(S, SG, G-1)

(d) Compute p2=path in the graph with granularity G between SG and EG
(e) Let p3=Path(S, SG, G-1)

The result is the concatenation of the three paths p1, p2, p3.

The spatial geometrical decomposition is illustrated by the following algorithm
PROCEDURE PathM(S, E, MP: Coordinate_type): Path_type where MP is a intermediate point between the starting point S and the ending point E that is part of a resulting path. A simple algorithm might be
(a) Identify an intermediate point MP1 between S and MP
(b) Identify an intermediate point MP2 between MP and E
(c) p1=Path(S, MP, MP1)
(d) p2=Path(MP, E, MP2)

The result is the concatenation of the two paths p1 and p2.

These two procedures exemplify how participants could be guide participants together, commonly. The synchronization of the navigational information of each participant should affect that the individual paths should attract. I.e. the choice of a path of a participant depends on the other paths of the other participants. And the alignment of the navigational information is quite simple using the above stated intermediate points. The trick is simply to involve the paths of the other participants when selecting intermediate points. Suppose for simplicity the path of a participant, J say, is represented as a list of points [PJ1, PJ2, . . . , PJn]. Further suppose a weight function $w((X1,Y1),(X2,Y2))$ that depends on the distance between points (X1,Y1) and (X2, Y2), e.g. $(X1-X2)^2+(Y1-Y2)^2$. Note that this is not the distance. Preferably a weight function where close points yield to a (very) high weight and for apart points to a very low (zero) weight.

Denote $X((X,Y))=X$, and $Y((X,Y))=Y$. A selection of an intermediate point between PA and PB could be done according to the following weighted mean algorithm $$X1 = [c*X(PA) + c*X(PB) +$$
$$w(PA, PJ1)*X(PJ1) + w(PA, PJ2)*X(PJ2) +$$
$$\ldots + w(PA, PJ2)*X(PJn) + w(PB, PJ1)*X(PJ1) +$$
$$w(PB, PJ2)*X(PJ2) + \ldots + w(PB, PJ2)*X(PJn)]/[2*c +$$
$$w(PA, PJ1) + \ldots + w(PA, PJ2) + w(PB, PJ1) + \ldots + w(PB, PJ2)]$$
$$Y1 = [c*Y(PA) + c*Y(PB) + w(PA, PJ1)*Y(PJ1) + w(PA, PJ2)*Y(PJ2) +$$
$$\ldots + w(PA, PJ2)*Y(PJn) + w(PB, PJ1)*Y(PJ1) +$$
$$w(PB, PJ2)*Y(PJ2) + \ldots + w(PB, PJ2)*Y(PJn)]/[2*c +$$
$$w(PA, PJ1) + \ldots + w(PA, PJ2) + w(PB, PJ1) + \ldots + w(PB, PJ2)]$$

and identify as the intermediate point the closest point to (X1,Y1) in the graph. (c is a constant that assures the high and equal weight of PA and PB).

To enable attraction between the paths in the algorithm PathM one could identify the intermediate points in step (a) and (b) simply by applying any such weighted mean procedure.

Similarly this principle is inherited to any hierarchy in the above mentioned algorithm PathG.

In practical implementations this has the effect that every path in every hierarchy is dependent on each participants path. For instance might a fast change of one participants position affect a high level choice of transportation means, e.g. the choice of a subway instead of a bus, etc.

Another aspect of a preferred embodiment is the exchange of navigation information between transport participating systems. That might be a time table of a bus or a detour map part update due to a construction site or a congestion. The instantaneous exchange of navigation information allows to adapt all participants' paths, e.g. with the above method, to all unexpected and unforeseen eventualities. Where the only constraint is that they meet at an even floating common fuzzy end point/check point.

The exchange of navigation information, e.g. paths, coordinates, or even maps, images and whole graphs that consist of alternative paths requires telecommunication techniques, e.g. a GSM/GPRS or a UMTS network might be suited to exchange navigational information according to a suitable application protocol. Also hot spot networks are suited to establish (information) transport layer. The application itself could be a local software receiving foreign navigational information as well as a server within a telecommunication infra structure. The communication means might even change while approximating the check point, e.g. by establishing a Bluetooth interconnection link between participants that are close together and notifying them by acoustic or visual notification in order to get them together.

In order to illustrate an example scenario a set of figures now is described. FIG. 1 shows three devices DA, DB, and DC. Each of them is interlinked with each other by three point to point interlinks IL, shown by the dotted double arrows. The figure shows also a check point CP and three trajectories TA, TB, and TC, depicted by dashed arrows pointing to the check point.

The figure illustrates that mobile devices are used for navigational purposes in order to guide a user along a trajectory to a common check point CP. Therefore each mobile device DA, DB, and DC is interlinked with each other in order to establish at least a common check point CP. Each mobile device DA, DB, and DC guides his user along a path, here shown as trajectory TA, TB, and TC to the check point CP.

Figure 2:
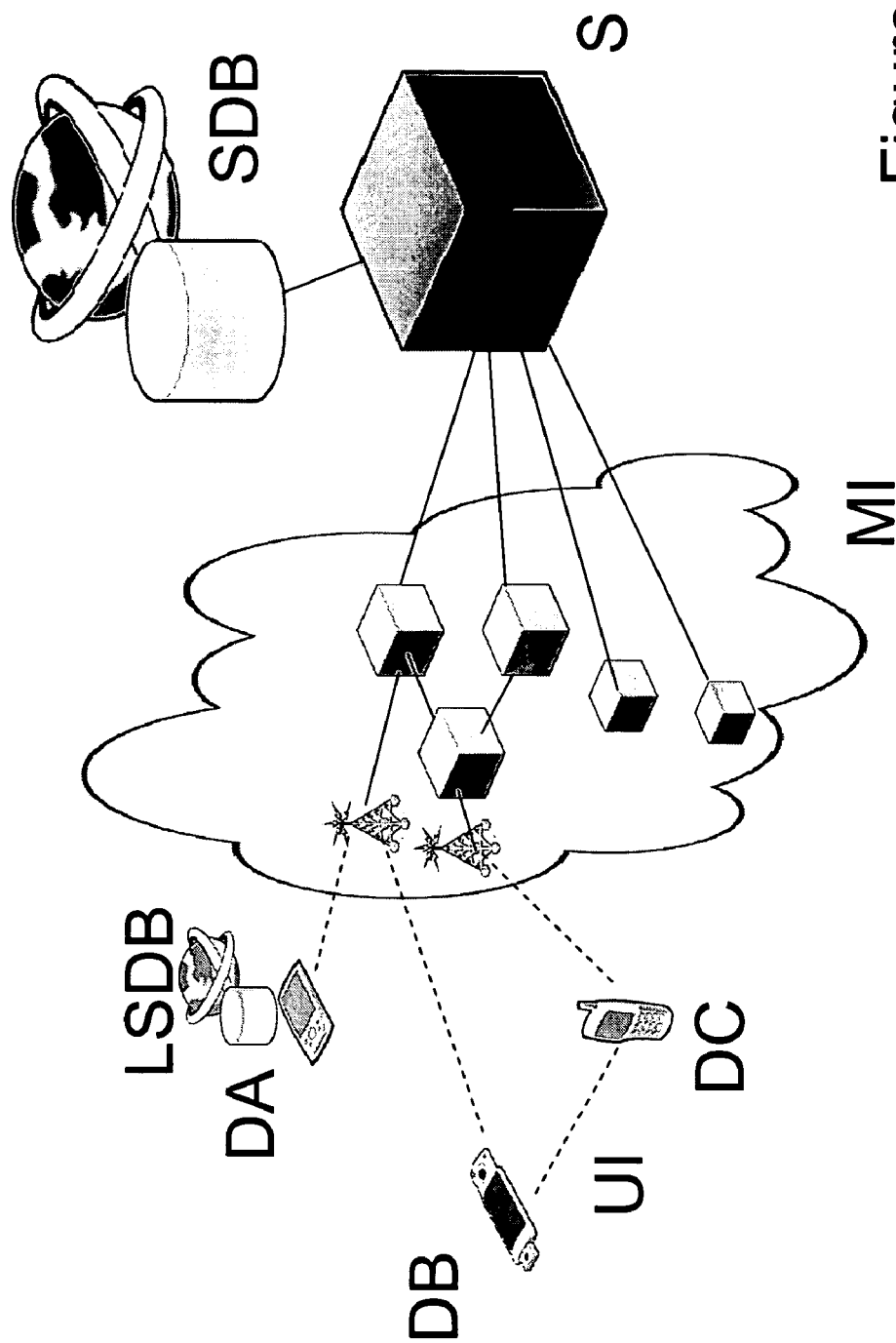
FIG. 2 is a drawing of the infra structure that might be involved by a mobile device when providing a location based appointment service according to the invention.

FIG. 2 shows in principle a mobile infrastructure behind a service according to the invention. Each of the aforementioned mobile devices DA, DB, and DC are connected via an access network MI to a server S. The server S as well as some of the mobile devices DA have access to spatial data base SDB or even have a local spatial data base LSDB in form of a map or images or the like. Either the infra structure supports location information e.g. by certain locator agents or the devices itself are enabled e.g. to triangulate their position using e.g. GPS. Alternatively any other relative or absolute available and suited positioning means might be used. For instance a direct link between two devices could be used to measure the distance. A coarser information might be a valid mobile cell ID or the ID of a hot spot, or a combination of such means.

The method according to the invention, i.e. the appointment service could either be sited on the server S or distributed between the mobile devices DA, DB, and DC. It is even conceivable that a software, e.g. a Java application could be downloaded from a server that supports such an appointment service on a client by making use of the computational power of the mobile device and its telecommunication capabilities (to derive, align, and exchange navigational information).

Figure 3:
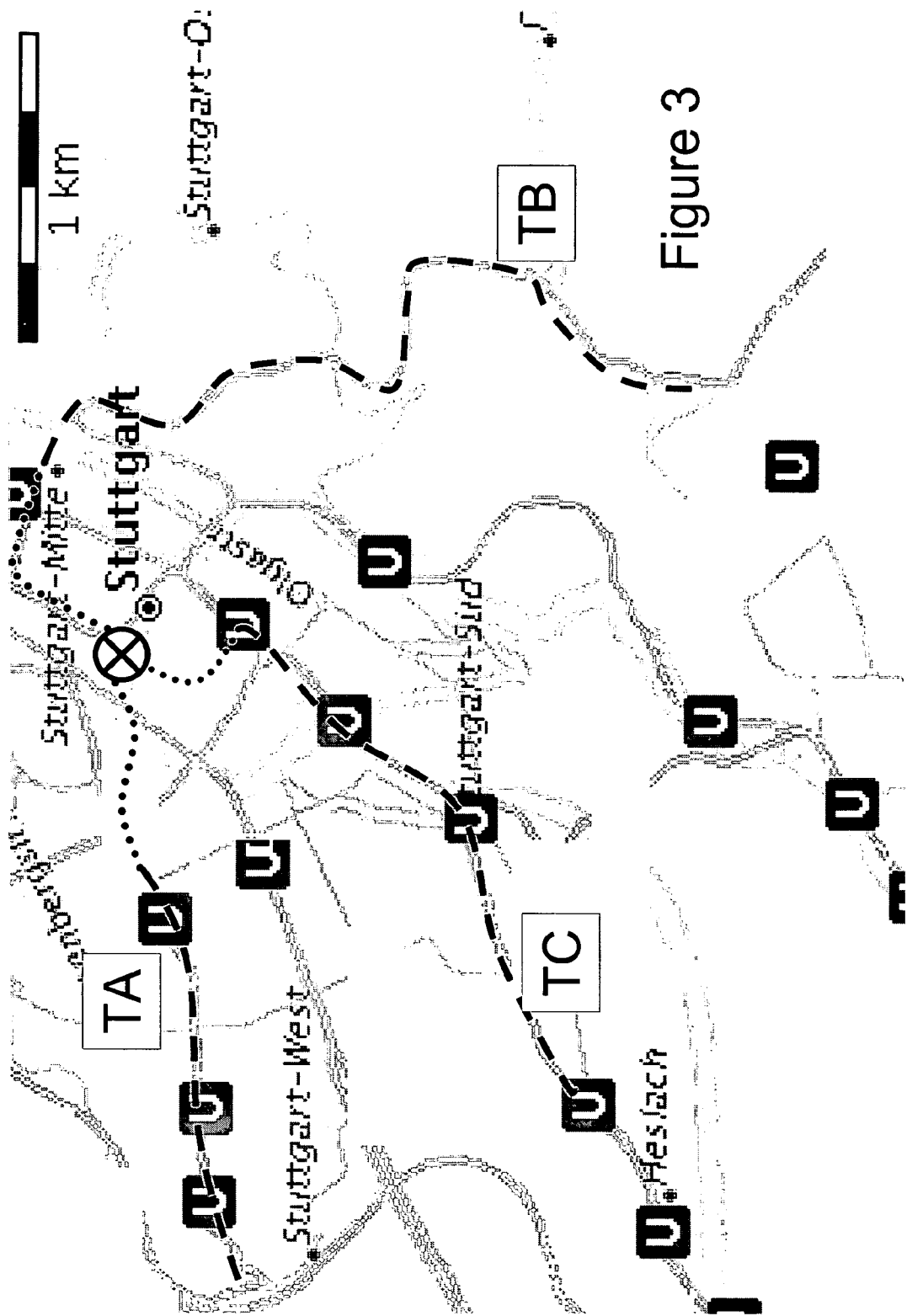
FIGS. 3 to 5 are drawings of sample common navigation maps illustrating a large scale appointment scenario with location based appointment service according to the invention.

FIG. 3 illustrates the paths rendered by the three mobile devices TA, TB, TC on a first coarse graph (map). The dotted line is the part of the path that is derived by using a finer granularity graph, which is shown in FIG. 4.

Figure 4:
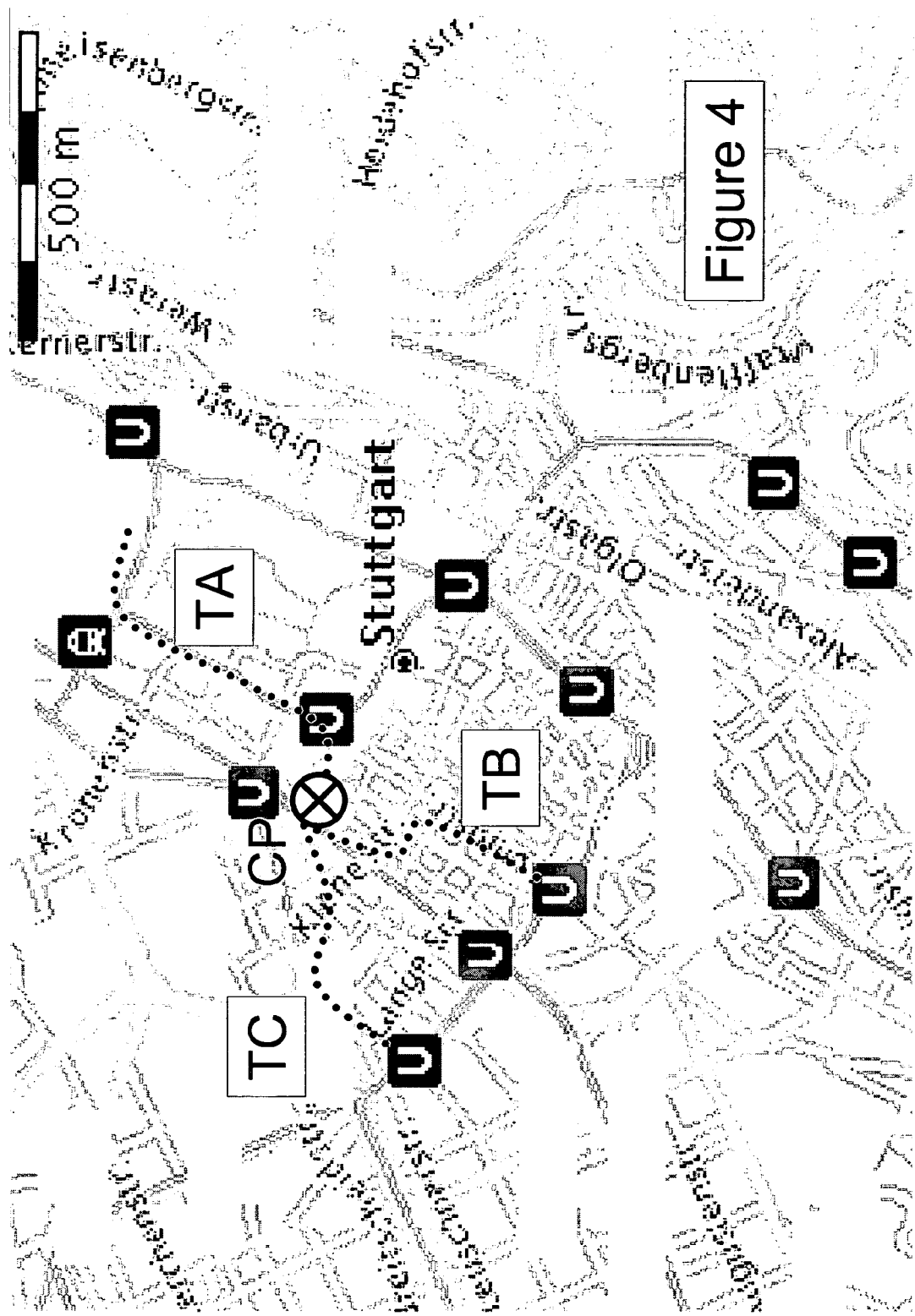

FIG. 4 shows a finer graph with more details, especially a detailed path for each mobile device TA, TB, and TC ending at the check point CP. As the participants approximate the point, naturally the granularity becomes finer, i.e. more detailed. The figure now shows for instance that the participant having mobile device TB and TC will meet before they meet the participant using mobile device TA.

Figure 6:
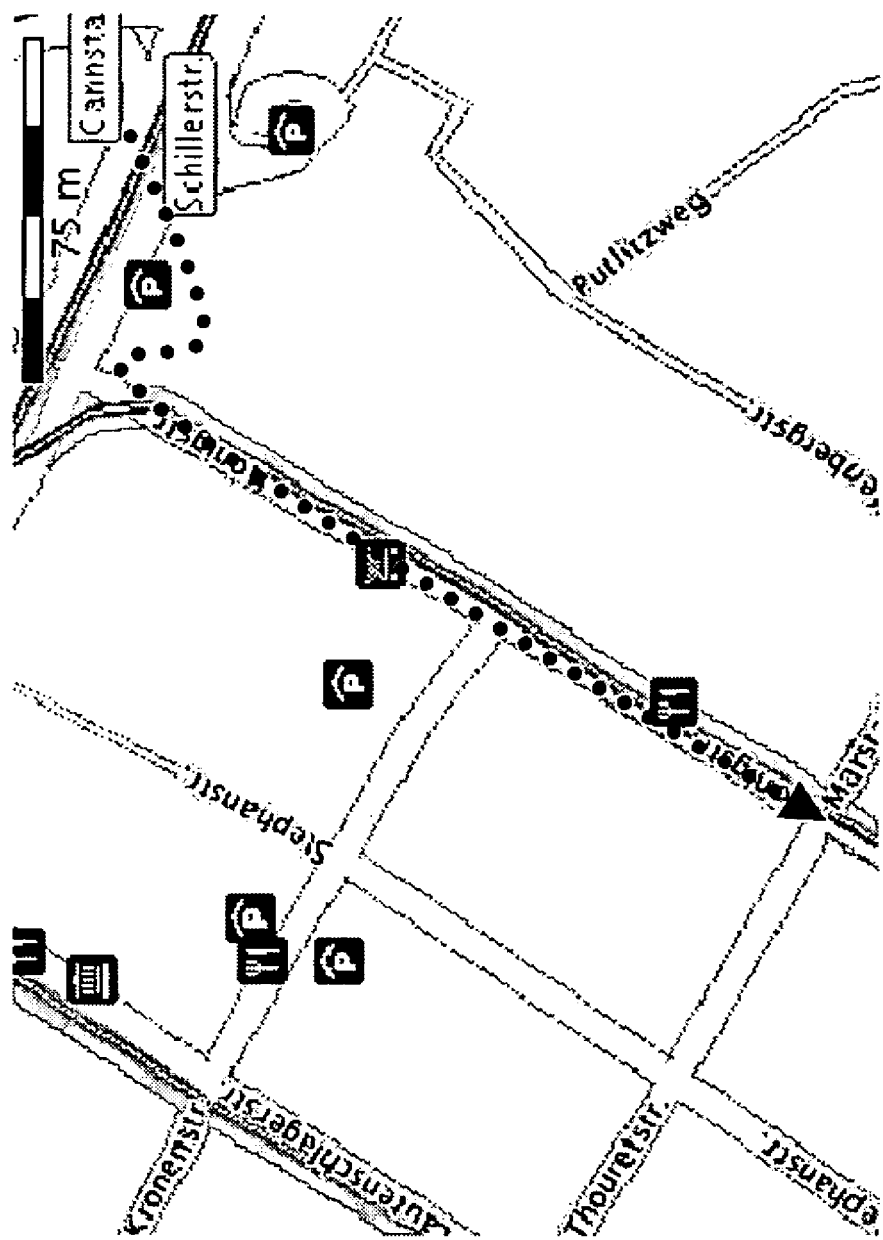
FIGS. 6 to 8 are drawings of sample common navigation maps illustrating a personal guiding appointment scenario with location based appointment service according to the invention.
Figure 7:
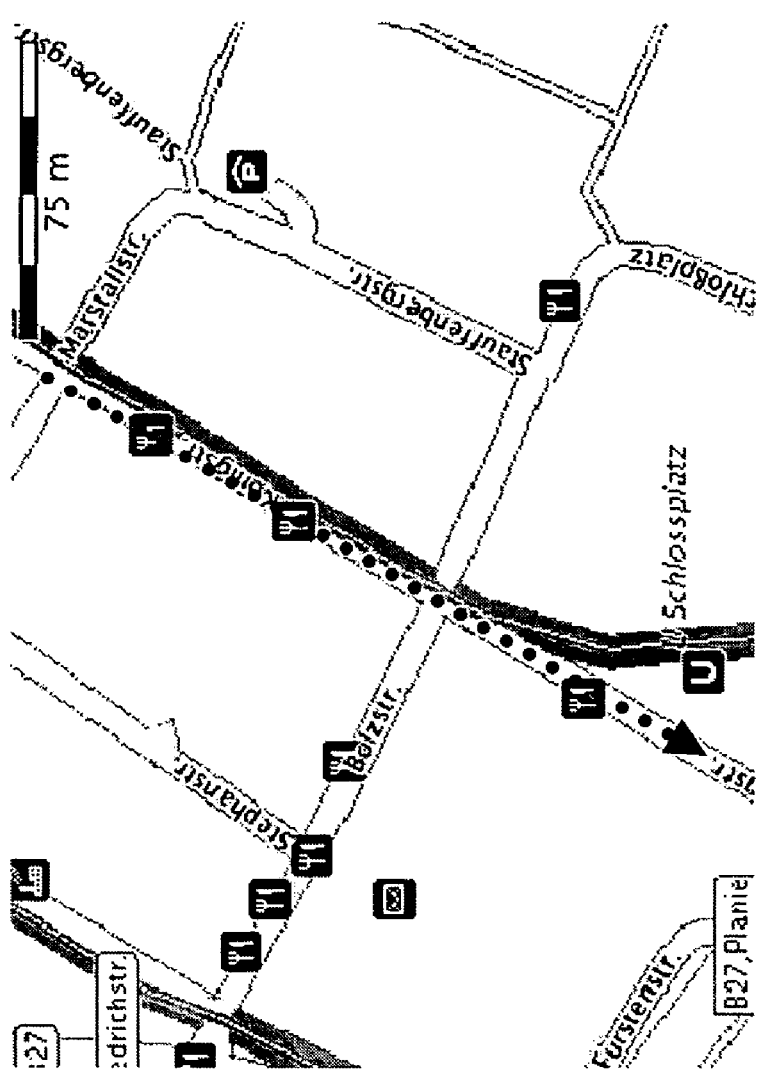
Figure 8:
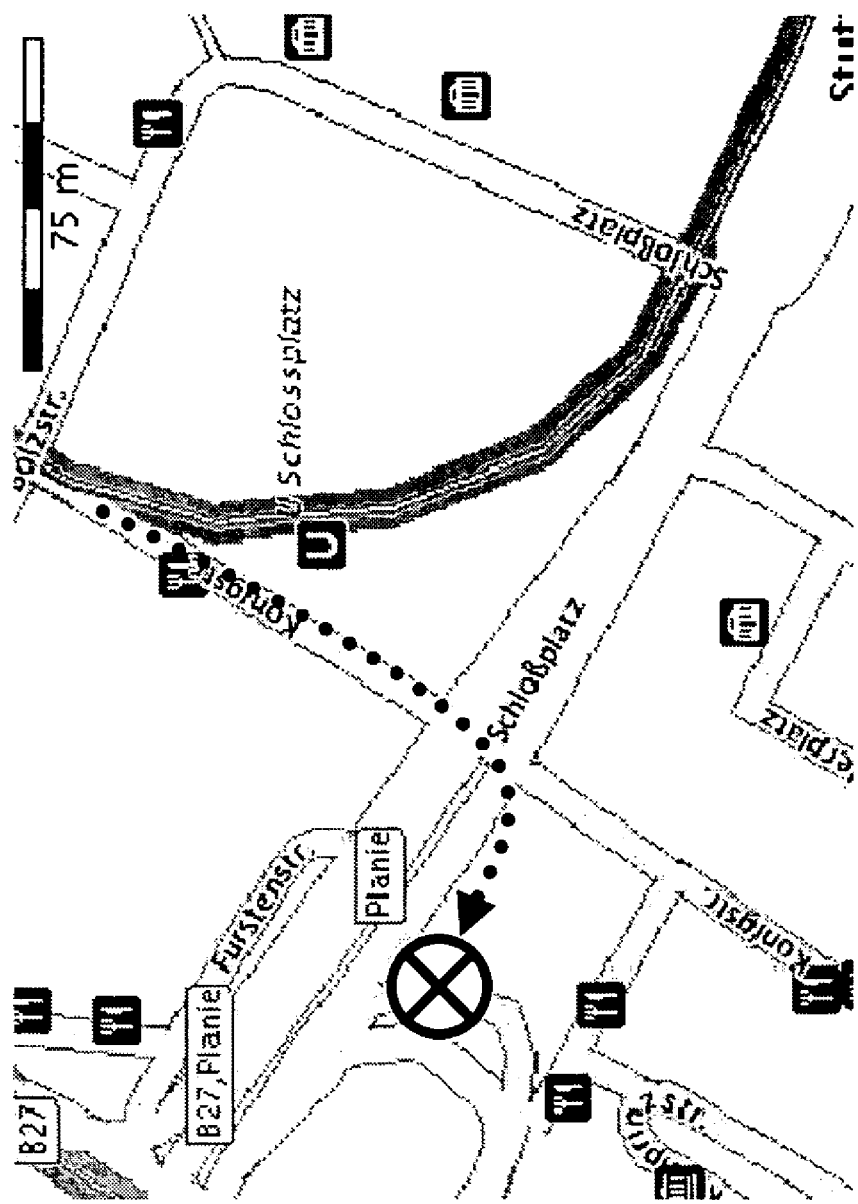

FIG. 6 to FIG. 8 show screen shots of the mobile device DA. The user is guided along a street (Königstrasse in Stuttgart) shown by the dotted line. When he moves the section of the map is adapted to show only current relevant navigation information. This information might also comprise expected arrival (meeting) time or the coordinates and routes of other participants (not shown in these pictures). Finally, the check point CP (at the Schlossplatz) is shown by a circled X.

Figure 5:
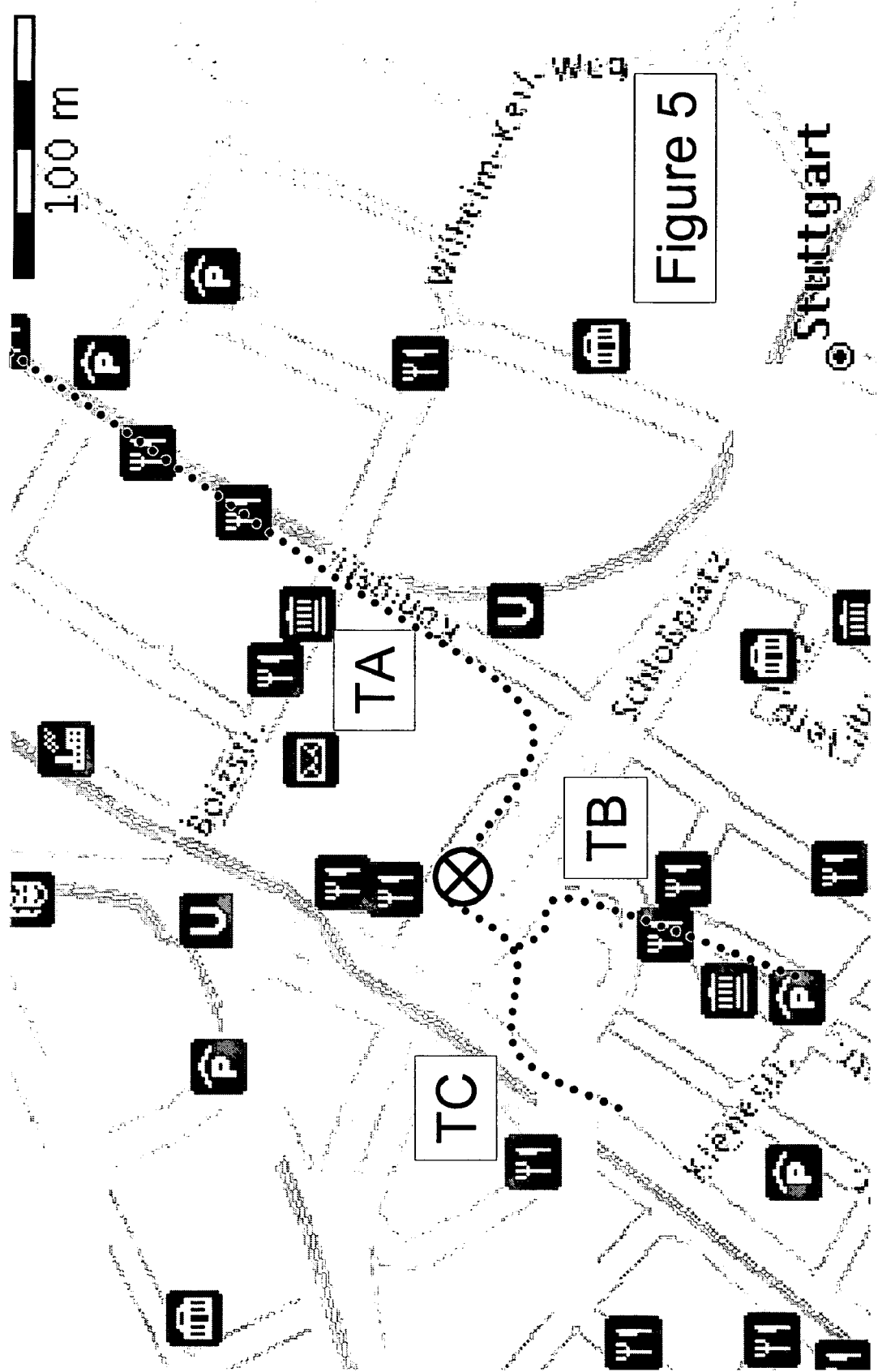

FIGS. 6 to 8 illustrate the above mentioned spatial decomposition, FIGS. 3 to 5 the hierarchical decomposition.

FIG. 9 shows a preferred visual presentation for notifying a participant that he is close to the check point. The figure shows the three recommended paths or trajectories TA, TB, and TC (the dashed arrows), as well as the current position of participant B and participant A. There are also shown alternative paths TB' and TC' (dotted lines) having about the same length. The recommended paths TB and TC support a preliminary meeting of participant C and participant B and a common path to the checkpoint CP—which is preferable. FIG. 10 is the upright projection of FIG. 9.

Although illustrative presently preferred embodiments and applications of this invention are shown and described herein, many variations and modifications are possible which remain within the concept, scope, and spirit of the invention, and these variations would become clear to those of skill in the art after perusal of this application.

The notification means could be designed to support the approximation like an approximation alert in an air plain navigation system, e.g. acoustically (synthetic guiding speech, repetition, increasing loudness when approximating, etc.) or optically (changing scales and presentations e.g. maps, pictures, arrows, text etc.).

While the whole navigation and approximation process the system even might be enabled to render automatically (within agreed limits) a new (appointment) check point based on a posteriori evaluation, i.e. based on the current position on the (e.g. measured really movements) path histories of the participants, or even on context information like detours, time tables, congestion etc.

The technical realization could preferably be done reusing existing navigation services and routing services as commonly known from the Internet. The spatial (location) information is available on most mobile service platforms, usually under the term geo-local interface. A further information could be the (moving) participant himself maybe e.g. maintaining manually a checklist of (reached) positions.

Preferably the user interface is designed interactive allowing the user to move virtually on his/her (navigation) path and to adapt the navigation information immediately if a user gets lost.

All the interactive means are intended to enable a just in time optimization of the communicating navigation paths and the check point coordinates.

What is claimed is:

1. A method for providing a location based appointment service for deriving common meeting coordinates for a plurality of subscribers, the method comprising the steps of
arranging the meeting co-ordinates between the plurality of subscribers;
determining the location and navigation information of at least one of the plurality of subscribers to the meeting co-ordinates;
providing the navigation information by a wireless device, in order to guide the at least one of the plurality of subscribers to adhere to the meeting co-ordinates; and
aligning the navigation information with the navigation information of at least one other of the plurality of subscribers, wherein a posteriori navigation information is further iteratively aligned such that the plurality of subscribers are guided commonly on approximating routes and such that the meeting co-ordinates are re-arranged between the plurality of subscribers.

2. The method according to claim 1, wherein said method comprises the further step of providing location information of at least one of the plurality of subscribers to at least one other subscriber of the plurality of subscribers.

3. The method according to claim 1, wherein the arranging meeting co-ordinates or the providing of the navigation information consider possible alternative means of transportation.

4. The method according to claim 3, wherein said method comprises the further step of exchanging and aligning navigation information with navigation information from a possible means of transportation.

5. The method according to claim 1, wherein said meeting co-ordinates or a route comprise fuzzy floating parts that are aligned by dynamically updated navigation information just in time.

6. The method according to claim 1, wherein a choice of a communication means for aligning the navigation information depends on the distance between the wireless devices.

7. The method according to claim 1, wherein the navigation information is decomposed hierarchically and spatially.

8. A computer readable medium having a computer program product for performing the method according claim 1.

9. A server that is configured to perform the method according to claim 1.

10. A telecommunication network device that is configured to perform the method according claim 1.

11. A mobile telecommunication device capable of providing a location based appointment service for deriving common meeting coordinates for a plurality of subscribers, the device comprising:
a module that arranges the meeting co-ordinates between the plurality of subscribers;
a module that determines the location and navigation information of at least one of the plurality of subscribers to the meeting co-ordinates;
a module that provides the navigation information by a wireless device, in order to guide the at least one of the plurality of subscribers to adhere to the meeting co-ordinates; and
a module that aligns the navigation information with the navigation information of at least one other of the plurality of subscribers, wherein a posteriori navigation information is further iteratively aligned such that the plurality of subscribers are guided commonly on approximating routes and such that the meeting co-ordinates are re-arranged between the plurality of subscribers.

* * * * *